United States Patent [19]
Masser

[11] 3,847,442
[45] Nov. 12, 1974

[54] DUAL RIM WHEEL STRUCTURE
[75] Inventor: Lloyd D. Masser, Muskegon, Mich.
[73] Assignee: Lear Siegler, Inc., Santa Monica, Calif.
[22] Filed: Dec. 6, 1972
[21] Appl. No.: 312,725

[52] U.S. Cl............................. 301/13 SM, 301/13 R
[51] Int. Cl............................................. B60b 23/00
[58] Field of Search......... 301/13 SM, 13 R, 10 DC, 301/5 R, 5 VH, 10 R, 18, 19, 6 R, 6 A, 95, 97, 98, 10 CD, 39 R, 36 R

[56] References Cited
UNITED STATES PATENTS

| | | | |
|---|---|---|---|
| 1,827,792 | 10/1931 | Keller | 301/13 SM |
| 1,884,936 | 10/1932 | Walther | 301/13 SM |
| 2,162,732 | 6/1939 | Lyon | 301/5 VH |
| 2,194,206 | 3/1940 | MacDonald | 301/13 R |
| 3,237,992 | 3/1966 | Kiesau | 301/39 R |
| 3,337,270 | 8/1967 | Peterson | 301/39 R |
| 3,355,218 | 11/1967 | Forbush | 301/6 R |
| 3,421,797 | 1/1969 | Walther | 301/13 SM |

FOREIGN PATENTS OR APPLICATIONS

| | | | |
|---|---|---|---|
| 220,264 | 8/1924 | Great Britain | 301/10 R |

Primary Examiner—M. Henson Wood, Jr.
Assistant Examiner—Reinhard J. Eisenzopf
Attorney, Agent, or Firm—Barnes, Kisselle, Raisch & Choate

[57] ABSTRACT

The spokes of a wheel fit within a pair of conventional drop center rims. Radial flanges on the axially inner ends of the spokes are shaped to engage an angular configuration on the drop center opposite from the locking angle. The edges of a spacer ring are shaped to engage the locking angles of the inner and outer rims.

2 Claims, 9 Drawing Figures

PATENTED NOV 12 1974

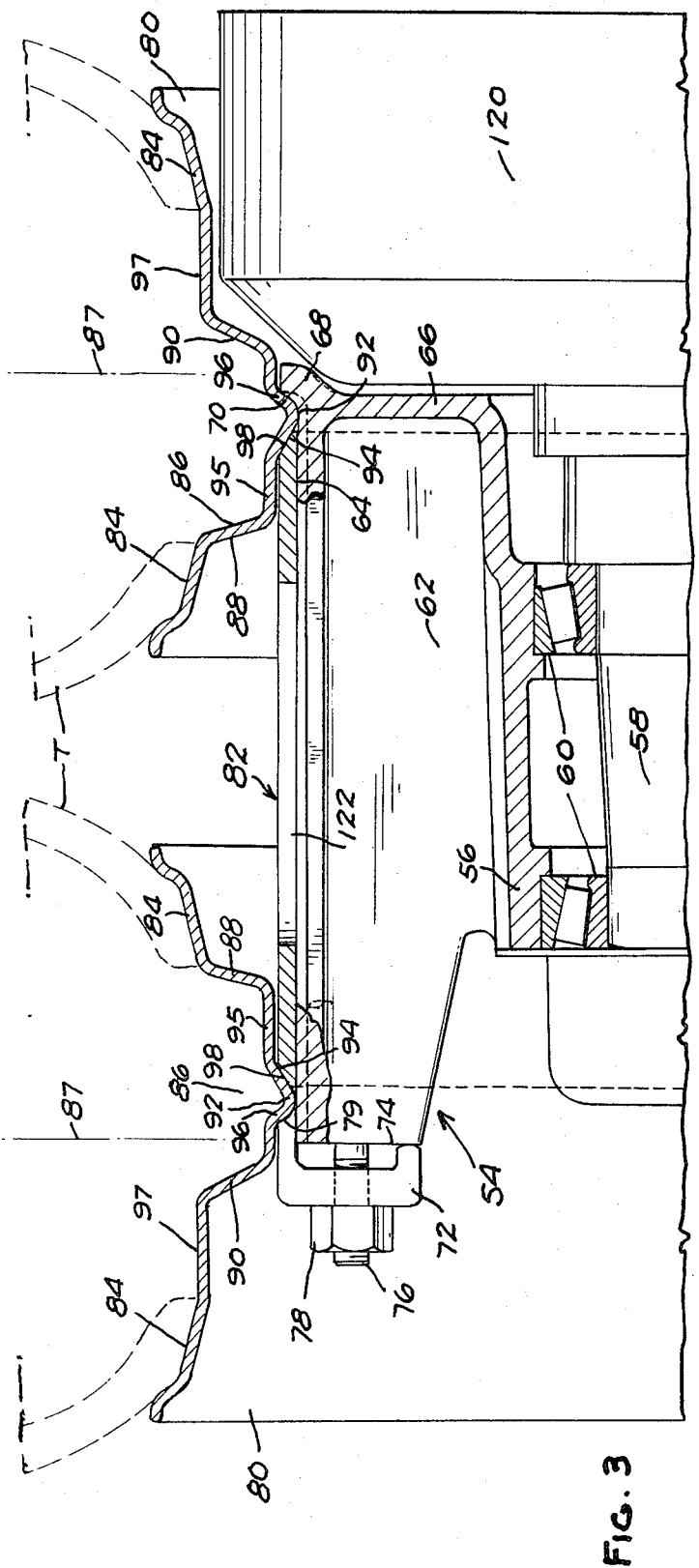
FIG. 3
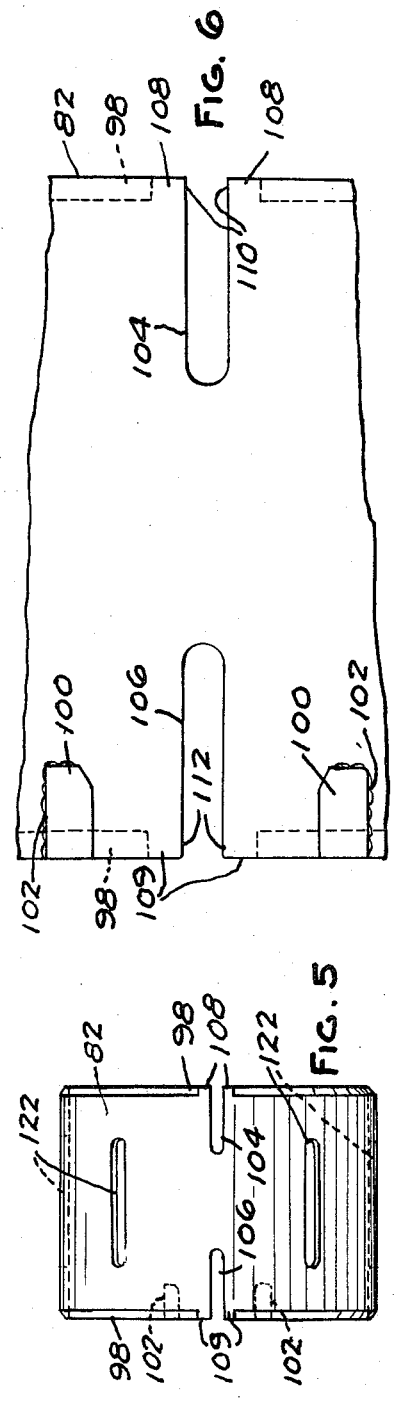
FIG. 6
FIG. 5

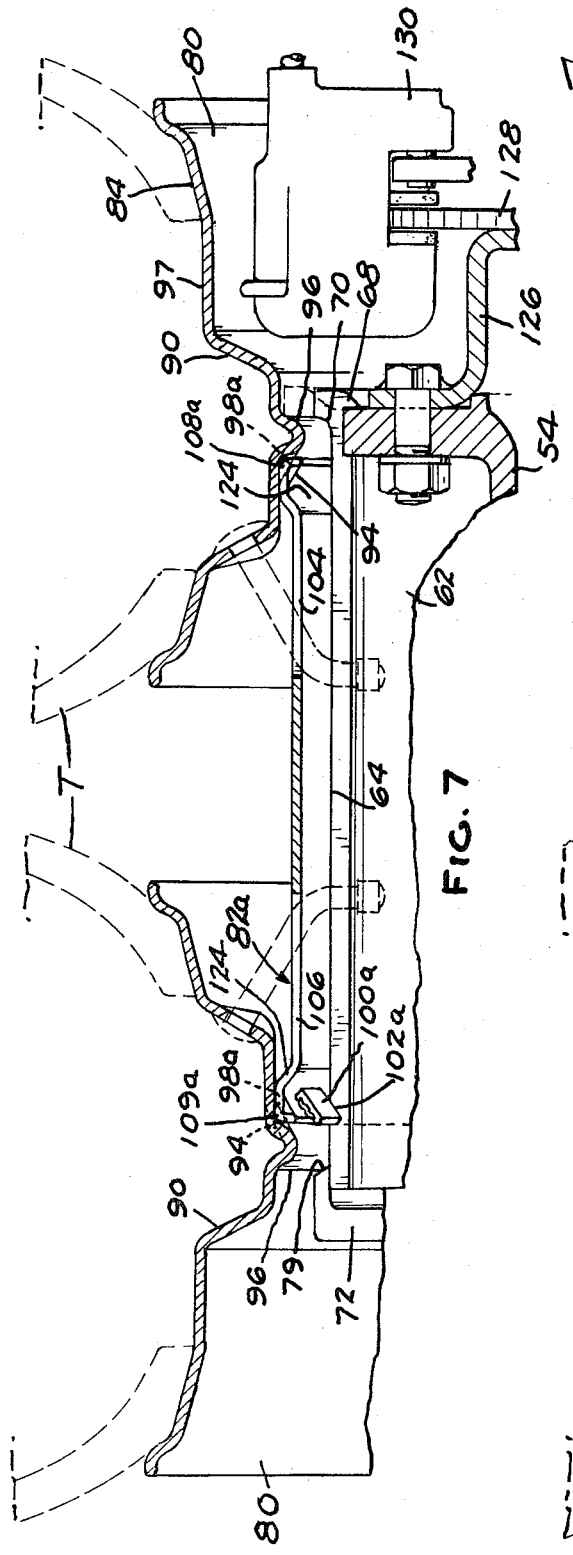
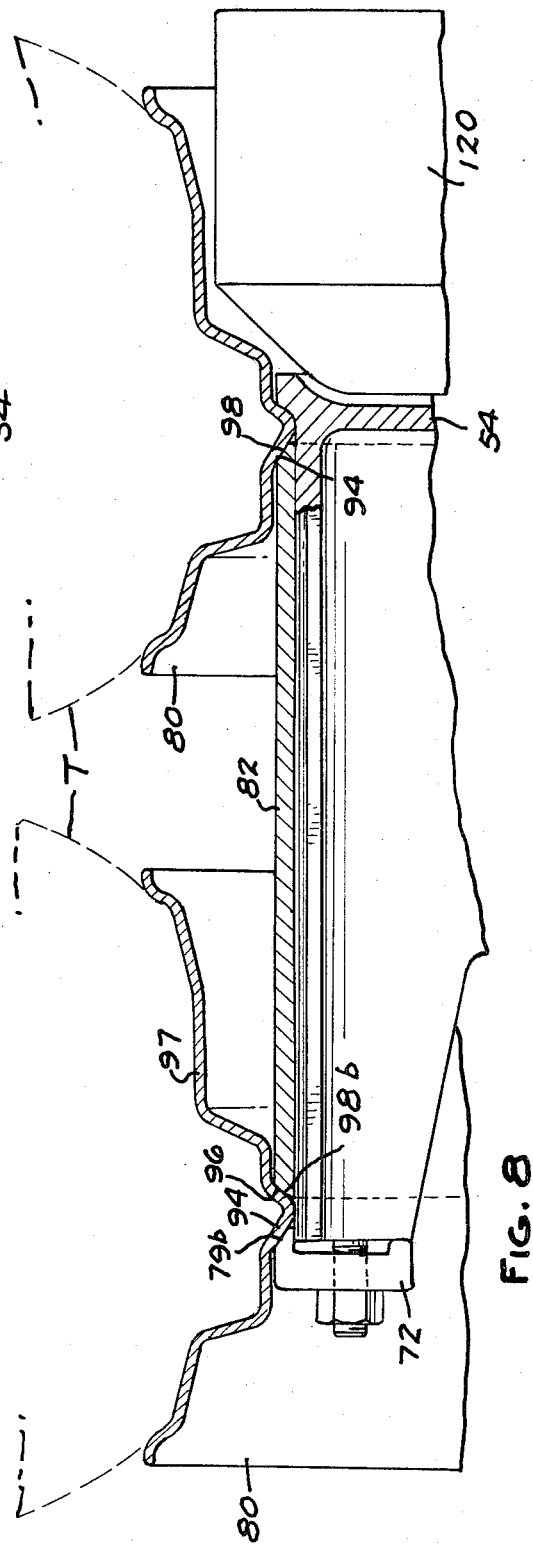

DUAL RIM WHEEL STRUCTURE

This invention relates to vehicle wheels having dual rims and tires mounted thereon.

The conventional dual rim type wheel is axially compact so that the inner rim thereon clears the brake drum or other braking mechanism. All such wheels are designed for use with split rims. All such wheels and rims now on the market have a diameter of at least 15 inches.

Drop center rims of a diameter less than 15 inches are commonly available but heretofore it has not been feasible to mount these rims in dual relation on a wheel. Consequently, in vehicles requiring wheels smaller than 15 inches it has been necessary to resort to suspensions embodying tandem axles mounting single tired wheels in order to obtain a required carrying capacity. In many vehicles such suspensions are objectionably complex, costly, heavy and space consuming. Therefore, it is not uncommon to find such vehicles equipped with single axle suspensions having wheels with single tires which are dangerously overloaded in use. This tendency is notable in the mobile home field where the tires only need to survive the trip from the factory to the building site.

Both split rims and single pirce or drop center rims are provided with a region which is angled at about 30° to the rim axis and this angle is engaged by a complementally angled flange on the wheel or by locking clamps on the wheel to lock the rim onto the wheel. Thus, this angled region is commonly referred to as the locking angle.

In the conventional wheel structure, both split rim and drop center rim, the locking angle on the rim is disposed axially away from the center of the wheel. Thus in a dual split rim assembly, the axially inner rim is mounted on the wheel with its locking angle disposed inwardly for engagement against a wheel flange while the axially outer rim is mounted with its locking angle disposed outwardly for engagement by locking clamps. An axial spacer ring is interposed between the two rims.

To mount a pair of drop center rims in this manner on a wheel would require a prohibitive axial lengthening of the wheel because of the configuration of the drop center rims. Moreover portions of the inner rim would not clear a normal sized brake drum which would require either a lengthening of the axle or the use of an undersized brake mechanism, both of which are prohibitive.

The object of this invention is to provide a relatively simple, inexpensive wheel structure which facilitates the use of conventional drop center rims in dual relation on a wheel and improved so that neither the wheel nor an axle upon which the wheel is mounted need be axially lengthened.

In general, the invention is carried out by providing the axially inner end of the wheel with radially outward flanging which is shaped to fit against a portion of the wall of the drop center of the rim which faces axially oppositely from the locking angle. This wall extends radially outwardly at an angle steep enough to clear a normal brake structure. Spacing means mounted around the wheel has edge portions shaped to engage against the locking angle of the inner rim and also has edge portions shaped to engage against the drop center, preferably the locking angle, of the outer rim. The rims and spacing means are locked in assembled relation on the wheel by locking clamps engaged against the drop center of the outer rim. Circumferentially interengaged means on the wheel and spacing means and on the spacing means and rims contain the wheel and rims against relatively circumferential slipping.

In the drawings:

FIG. 3 is a sectional view on line 3—3 of FIG. 2.

FIG. 5 is an elevational view of a spacer ring separate from the other parts.

FIG. 6 is a larger scale interior elevational view of the spacer ring taken in the direction of Arrow 6 of FIG. 2.

FIG. 7 is a view similar to FIG. 4 showing a modified form of the invention.

FIG. 8 is a view similar to FIG. 3 illustrating a modified form of the invention.

Figures 4, 9:
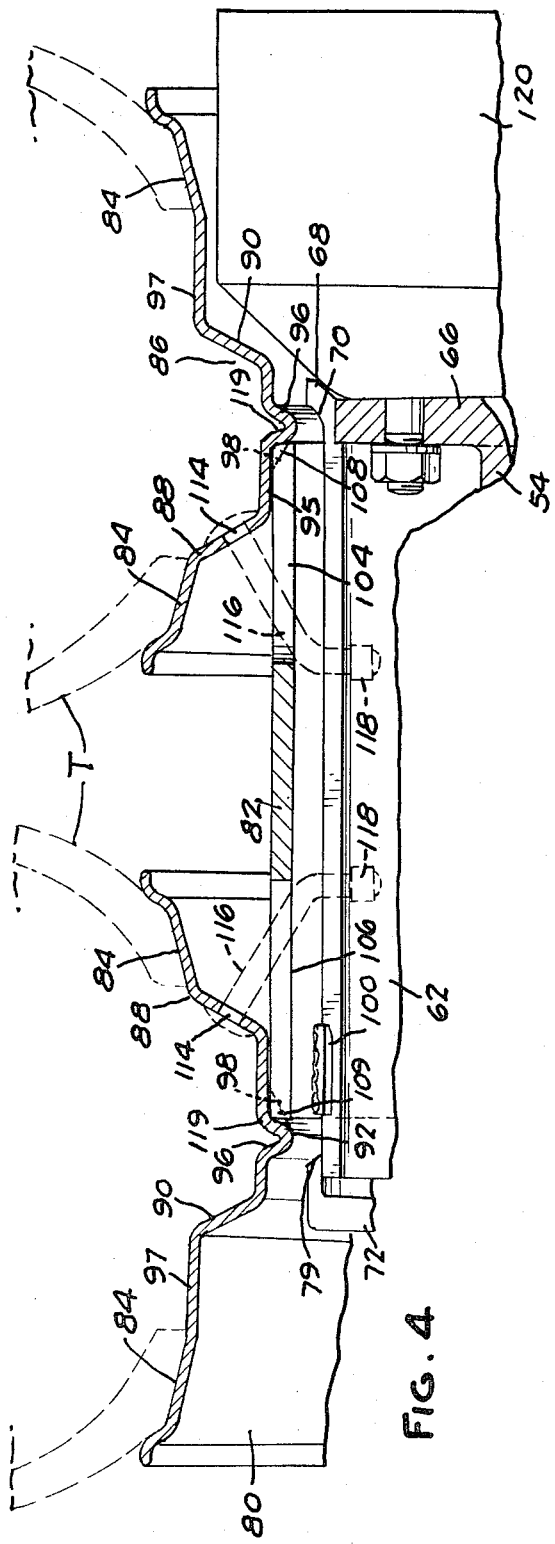
FIG. 4 is a sectional view on line 4—4 of FIG. 2.
FIG. 9 is a view similar to FIG. 3 taken on a smaller scale and illustrating a typical prior art structure.

Shown in FIG. 9 is a typical prior art structure wherein a pair of tires 20 are mounted in dual relation on a wheel 22 through a pair of split rims 24. Each wheel has a number of radial spokes 26, each having an outer surface 28 around which rims 24 and an interposed spacer 30 are mounted. Each rim has an annular, angularly disposed portion 32 which is termed a locking angle. The locking angle extends at about 30° to the axis of the rim.

Each spoke 26 has a radially outward flange 34 adjacent its axially inner end against which locking angle 32 of the inner rim engages. Each spoke also has a clamp 36 provided with a locking surface 38 which is engaged tightly against the locking angle 32 of the outer rim by means of a nut 40. The two rims and spacer 30 are thus axially locked between flange 34 and clamp 36. It will be observed that locking angles 32 are disposed axially away from the center of the wheel.

Figure 1:
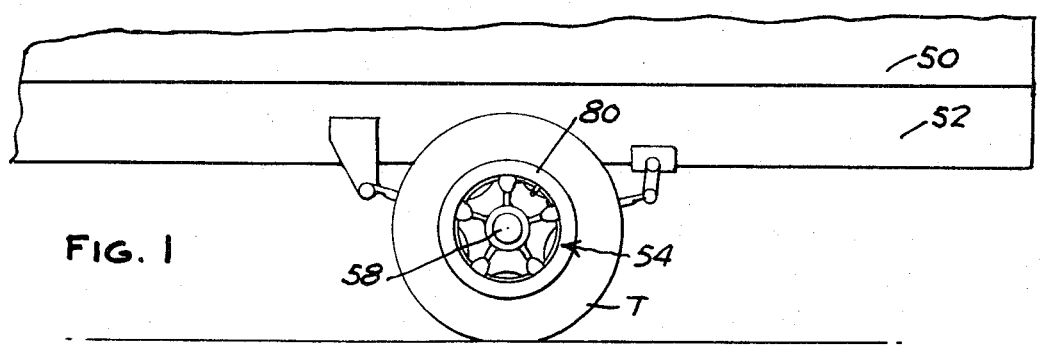
FIG. 1 is a fragmentary side elevational view of a vehicle having a wheel structure according to the present invention.
Figure 2:
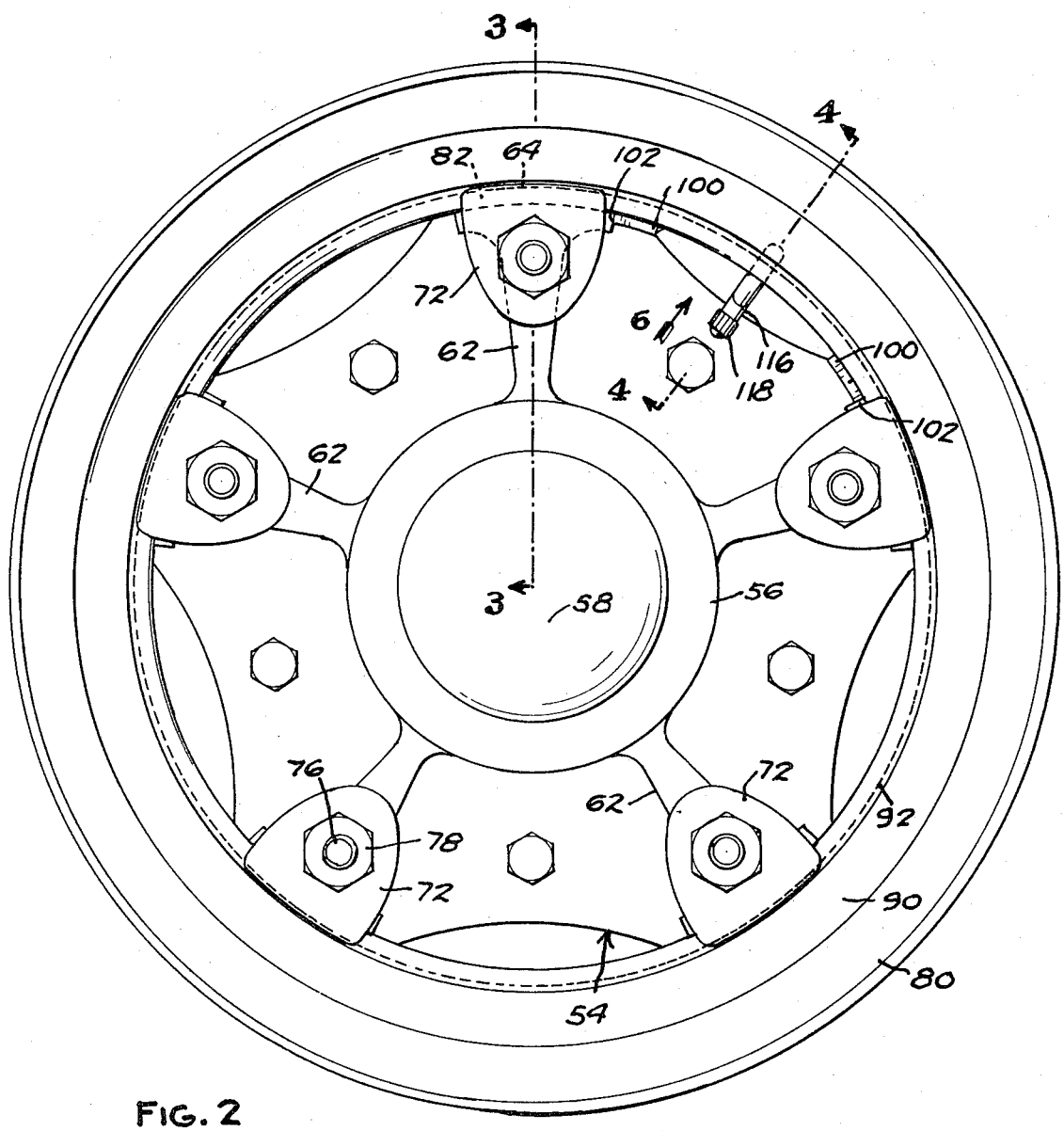
FIG. 2 is an enlarged elevational view of the wheel and rim combination, portions being shown in phantom to illustrate structural details.

Shown in FIG. 1 is a vehicle 50 having a frame 52 supported through a suitable suspension by dual tired wheels 54 according to the present invention. Each wheel 54 has a central hub 56 mounted on an axle 58 through a conventional bearing structure 60. A number of spokes 62 radiate from hub 56 and each spoke terminates at a radially outer surface 64. Surfaces 64 are curved to lie on the arc of a circle which defines the nominal size of wheel 54. Each spoke has adjacent its axially inner end 66 a radially outward flange 68 provided with an abutment surface 70 having a shape which is discussed below. A locking clamp 72 is secured to the axially outer end 74 of each spoke by means of a threaded stud 76 and nut 78 thereon. Each clamp has a clamping surface 79 shaped in a manner discussed below.

Wheel 54 is dimensioned to receive two conventional, preferably indentical drop center rims 80 and an axially interposed spacer ring 82. Each rim 80 has axially spaced tire bead seats 84 and an axially intermediate drop center or well 86. The center lines of the rims are indicated at 87. The drop center is defined by two walls 88, 90 adjoining at a radially inner apex 92 which fits around spoke surfaces 64. Side wall 88 contains a portion 94 adjacent apex 92 which extends at an angle of about 30° to the rim axis and defines the locking angle. Adjacent the locking angle is an axially extending portion 95. Wall 90 has a portion 96 on the opposite side of apex 92 from locking angle 94. Portion 96 is also angled to the axis of the rim but more steeply than locking angle 94. For convenience, portion 96 is sometimes referred to herein as an abutment angle. Rim 80 has a portion 97 which extends axially between wall 90 and a seat 84.

The abutment surface 70 on the flange 68 of each spoke 62 is shaped to fit the abutment angle 96 of a rim 80. Similarly, the clamping surface 79 on each clamp 72 is shaped to fit an abutment angle 96.

Spacer ring 82 has axial edge or end portions 98 tapered to fit locking angles 94 on rims 80. Ring 82 has a circumferentially spaced pair of internal lugs 100 each having a shoulder 102 positioned for circumferential engagement against a spoke 62.

The lugs may comprise weldments, deformities in the ring, struck up portions or the like. In the structure illustrated, shoulders 102 are positioned for engaging circumferentially oppositely disposed surfaces of adjacent spokes 62. However the lugs can be positioned at any circumferential location on ring 82 so long as their shoulders 102 by engagement with a spoke or spokes prevent circumferential turning of ring 82 in either direction on the wheel.

The ring has a pair of axially elongate openings 104, 106 flanked respectively by a pair of radially outward tabs 108, 109 defining circumferentially spaced shoulders 110, 112 in edge portions 98. These tabs may comprise weldments, deformities, struck up portions of ring 82 or the like. As is conventional, the wall 88 of each rim is apertured at 114 (FIG. 4) to pass a valve stem 116. The valve stems also extend through spacer ring openings 104, 106 so that the ends 118 of the valve stems are at an accessible location inwardly of the ring and between spokes 62. In assembled relation of the parts, shoulders 110, 112 are positioned for circumferential engagement against opposite sides of conventional radial embossments forming locking lugs 119 (FIG. 4) on rims 80. For convenience of illustration, slots 104, 106 are shown in mutual alignment but they could be circumferentially offset from one another.

After tires T and valve stems 116 have been mounted on a pair of rims 80, the rims are mounted on wheel 54 by the following procedure. First, one rim is oriented so that its abutment angle 96 faces axially inwardly and the rim is slipped over the wheel until its abutment angle engages against abutment surfaces 70 of spoke flanges 68. The rim is circumferentially oriented so that valve stem 116 is disposed in the space between two spokes 62. Spacer ring 82 is then slipped over the wheel with tab shoulders 110 circumferentially aligned for engagement with the sides of locking lug 119; a tapered edge 98 of the ring is engaged against locking angle 94 on the rim previously mounted.

During this procedure, the ring and rim may be circumferentially adjusted to insure proper interengagement of tab shoulders 110 with locking lug and to insure circumferential engagement of lug shoulders 102 against the sides of a pair of spokes 62. Valve stem 116 on the mounted rim passes through slot 104.

Next a second rim 80 is oriented with its locking angle 94 disposed axially inwardly and its valve stem 116 circumferentially aligned with outer slot 106. The rim is advanced inwardly over the wheel until its locking angle engages taper 98 at the outer edge of ring 82. Valve stem 116 passes through outer slot 106 in the ring and tab shoulders 112 engage circumferentially against locking lug 119 on the outer rim. Finally, the clamping surface 79 on each locking clamp 72 is engaged firmly against abutment angle 96 of the outer rim by turning nut 78 in the appropriate direction.

The locking force of clamp 72 is transmitted axially through abutment angle 96 and locking angle 94 of the outer rim to ring 82 and then to the locking angle of the inner rim causing abutment angle 96 on the inner rim to be firmly engaged against abutment surfaces 70 on spoke flanges 68. Engagement of lug shoulders 102 against spokes 62 prevents ring 82 from turning circumferentially relative to wheel 54. Engagement of tab shoulders 110, 112 against the sides of locking lugs 119 prevents rims 80 from turning circumferentially relative to ring 82. Thus the wheel, ring and rims are locked together to turn as a unit.

As is shown in FIGS. 3 and 4 wall 90 of the inner rim faces away from the center of the wheel and toward a brake drum 120 on axle 58. Wall 90 immediately outwardly of abutment flanges 68 turns radially outward at an angle steep enough to clear brake drum 120 and joins axial rim portion 97 at a radius large enough so that portion 97 and seat 84 radially clear the brake drum.

As will be apparent from FIGS. 3 and 4, if the inner rim were mounted on wheel 54 in the conventional manner with its locking angle 94 facing away from the center of the wheel, wall 88, because of the length of axial portion 95, would not clear brake drum 120. The rim would have to be backed axially away from the drum. This would require lengthening of axle 58.

Moreover, if the outer rim were mounted in the conventional manner with its locking angle 94 facing outwardly there would be insufficient clearance between the two tires T because of the axial length of rim portion 97 and the wheel would have to be axially extended to provide the necessary clearance. With the structure shown wherein both locking angles 94 face the center of the wheel, it is neither necessary to make the wheel longer than conventional, nor to lengthen axle 58 and still the inner rim will clear brake drum 120.

Wheel 54 is conventional in construction except that the abutment surfaces 70 on spoke flanges 68 and clamping surfaces 79 on clamps 72 are shaped to fit abutment angles 96 rather than locking angles 94. Rims 80 are standard inexpensive off-the-shelf products. Thus the invention provides a very simple inexpensive dual rim wheel structure which can have relatively small diameter and which can be used with standard axle and brake components.

While it is contemplated that the invention will find its greatest use with wheels 54 having a diameter smaller than 15 inches it is within the invention to use 15 inches and larger diameter wheels as well.

The invention is not limited to the use specifically of ring 82 as a spacer. Any means mountable axially between rims 80, engageable with locking angles 94, and having means to prevent the rims from turning on the wheel would suffice. Ring 82 could be fixedly secured as by welding to one or both rims which would simplify mounting and demounting of the rims relative to the wheel. However, the detachable structure illustrated is preferred as being more economical in manufacture and in situations where a single rim might be damaged and require replacement.

It is contemplated that during long use without removal from wheel 54, ring 82 may tend to become frozen to spoke surfaces 64. Ring 82 may be provided with a number of openings 122 (FIG. 5) circumferentially positioned for alignment with the spoke surfaces 64 to enable a tool to be inserted to a location adjacent the frozen surfaces to facilitate loosening them from each other.

The modified form of the invention shown in FIG. 7 is similar to the form described above except that spacer ring 82a is provided with beads 124 adjacent its axial ends or edges, the extremities of these beads providing tapered portions 98a for engagement against locking angles 94. Lugs 100a on tapered portions 98a provide abutment shoulders 102a positioned for circumferential engagement against portions of one or more spokes 62. Beads 124 are provided with outward tabs 108a and 109a adjacent the outer ends of 104, 106 for engagement with locking lugs 119.

In either form of the invention described above, wheel 54 can be adapted for use with disc type brakes. As shown in FIG. 7 the wheel is provided with an adaptor 126 which carries a brake disc 128, the braking mechanism being illustrated at 130. Axially inner rim wall 90, axial portions 97 and tire bead seat 84 clear the brake mechanism as shown.

The modified form of the invention illustrated in FIG. 8 is similar to the form first described above except that it is arranged so that the outer rim 80 is disposed with its locking angle 94 disposed axially outwardly instead of inwardly. The axially outer edge or end portion 98b of ring 82 is tapered to fit inwardly disposed abutment angle 96 of the outer rim. This form of the invention has the advantage that the clamping surfaces 79b of locking clamps 72 are shaped to fit locking angles 94 and thus clamps 72 can be of the conventional type. However, this structure necessitates lengthening wheel 54 for the reasons described above, the extent of this lengthening being apparent from a comparison of FIGS. 7 and 8. Also edges 98 and 98b of ring 82 are tapered at different angles and it would be possible to assemble the ring in a reversed position between rims 80. For these reasons the forms of the invention previously described are preferred.

The invention is particularly useful in connection with vehicles requiring more than light carrying capacity in combination with other requirements such as low profile, minimum cost and minimum number of axles. Examples of such vehicles are mobile homes, low bed trailers, industrial trailers and automobile haulers. The wheels are suitable for use in connection with either single or tandem axles suspended either through air or mechanical suspensions.

I claim:
1. Dual rim wheel structure which comprises,
two drop center rims each having axially spaced tire bead sets and an intermediate drop center defining a locking angle and an abutment angle disposed in axially opposite directions,
said locking angle and abutment angle extending respectively along a relatively smaller angle and a relatively steeper angle to the axis of said rim,
a wheel having abutment flange means adjacent its axially inward end shaped to fit said abutment angle,
said rims being mounted on said wheels with said abutment angle of one rim engaged against said flange means,
spacing means effective to space said rims axially apart,
and clamp means on said wheel engaging axially against the drop center of the other rim to secure said rims on said wheel,
said wheel having spokes on which said rims and spacing means are mounted, said spacing means having means engaged circumferentially against side portions of at least certain of said spokes to constrain said wheel and spacing means against relative circumferential movement,
said spacing means having shoulder means engaged circumferentially against lug means on said rims to constrain said spacing means and rims against relative circumferential movement,
said spacing means having shoulders spaced apart to pass a valve stem from said drop center to an exposed location radially inward thereof,
said shoulder means being provided on said spaced apart portions.
2. Dual rim wheel structure which comprises,
two drop center rims each having axially spaced tire bead seats and an intermediate drop center defining a locking angle and an abutment angle disposed in axially opposite directions,
said locking angle and abutment angle extending respectively along a relatively smaller angle and a relatively steeper angle to the axis of said rim,
a wheel having spokes with radially outer surfaces,
each of said spokes having adjacent its axially inward end a flange shaped to fit said abutment angle,
said rims being axially removably mounted around said spokes with their drop centers engaged against said spoke surfaces,
said abutment angle of the axially inner one of said rims being engaged against said abutment flanges,
a spacer ring being axially removably mounted around said spokes with its interior engaged against said spoke surfaces,
said ring having an inner axial end portion configured complementally to and engaged against said locking angle of said inner rim,
said ring having its opposite axial end portion configured complementally to and engaged against said locking angle of the axially outer rim,
a releasable clamp on each spoke having a clamping surface shaped to fit and being engaged axially against said abutment angle of said outer rim,
said spacer ring having first circumferentially spaced means engaged circumferentially against spoke portions and second circumferentially spaced means engaged circumferentially against means on at least one of said rims to secure said rims, ring and wheel against circumferential movement relative to each other,
each of said rims having a locking lug, said second circumferentially spaced means being so engaged against side portions of said locking lug on at least one of said rims,
said ring having axially elongate apertures to pass valve stems from tires mounted on said rims.

* * * * *